(No Model.)

V. H. McCONNELL.
HEATING AND PURIFYING FEED WATER FOR STEAM BOILERS.

No. 407,104. Patented July 16, 1889.

UNITED STATES PATENT OFFICE.

VIRGIL H. McCONNELL, OF BUFFALO, NEW YORK.

HEATING AND PURIFYING FEED-WATER FOR STEAM-BOILERS.

SPECIFICATION forming part of Letters Patent No. 407,104, dated July 16, 1889.

Application filed December 29, 1888. Serial No. 294,927. (No model.)

*To all whom it may concern:*

Be it known that I, VIRGIL H. McCONNELL, a citizen of the United States, residing at the city of Buffalo, in the county of Erie and State of New York, have invented a new and useful Improvement in Heating and Purifying Feed-Water for Steam-Boilers, of which the following is a specification.

This invention relates to the filtering devices which are employed in connection with steam-boilers for heating and purifying the feed-water before delivering it into the boiler, so as to avoid the deposit of scale or sediment in the boiler and its injurious consequences.

The object of my invention is the construction of a simple apparatus of this class which will effect a thorough and rapid purification of the feed-water, and which shall occupy but a small space.

The invention consists of the improvements, which will be hereinafter fully described, and pointed out in the claims.

Figure 1:
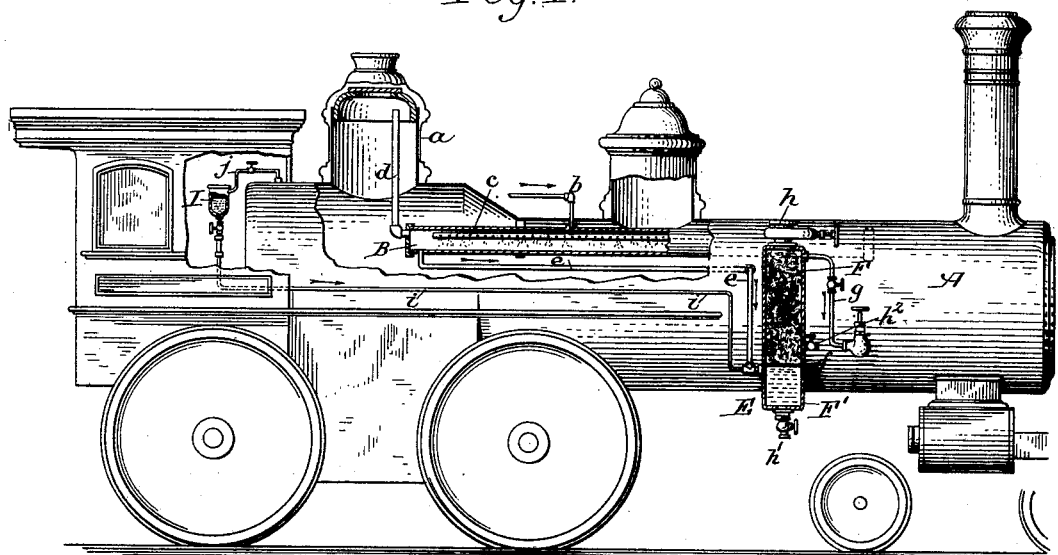
Figure 2:
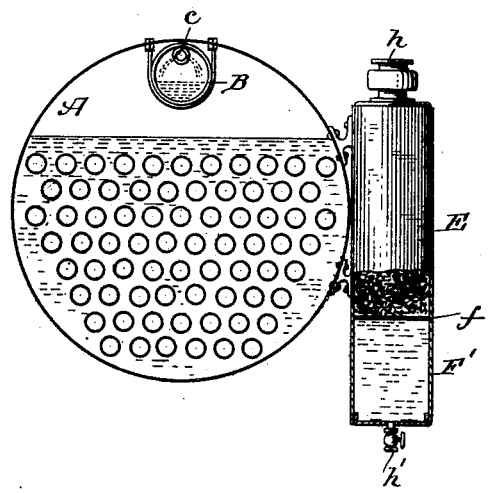

In the accompanying drawings, Figure 1 is a sectional side elevation of a locomotive, showing my improved filter applied to the boiler thereof. Fig. 2 is a transverse section of the boiler.

Like letters of reference refer to like parts in both figures.

A represents the boiler of the locomotive having the usual steam-dome $a$.

B is a horizontal water-heating chamber arranged within the boiler at the upper portion thereof, and which receives the feed-water from the supply-tank or other source through a pipe $b$. The latter is connected with a perforated pipe $c$, arranged within the heating-chamber B and extending nearly the entire length thereof, so that the water is sprayed into the heating-chamber in minute streams.

$d$ represents a supply-pipe, whereby steam is conducted from the interior of the boiler to the heating-chamber B, and which preferably terminates with its free end in the upper portion of the steam-dome $a$, where the steam is hottest. The water entering the chamber B is heated by the steam and thoroughly boiled, whereby the lime and other impurities contained in the water are liberated and precipitated. The delivery of the water into the heating-chamber in a finely-divided state subjects all the particles of water to the action of the steam and insures a thorough boiling thereof.

E represents a filter attached to the outside of the boiler and connected with the heating-chamber B by a pipe $e$ entering the under side of said chamber. The filter E may be of any well-known and approved construction, and consists, preferably, of an upper filtering-chamber F, containing sand and powdered coke or any other filtering medium, and a lower mud-chamber F', into which the impurities are deposited, and which is separated from the filtering-chamber F by a perforated false bottom or partition $f$. The supply-pipe $e$ of the filter is connected with the chamber F' below the false bottom.

$g$ is the discharge-pipe of the filter, which is connected with the upper portion of the filtering-chamber F, and through which the purified water is conducted from the filter into the boiler A. The boiling water entering the lower chamber of the filter rises and percolates through the filtering medium, which latter intercepts and retains any impurities contained in the water, while the purified water passes on and is discharged through the pipe $g$.

The filter is provided at its top with a gate or valve $h$ for the introduction and removal of the filtering material at its bottom, with a discharge-valve $h'$ for drawing off the mud or sediment from the chamber F', and with a blow-off valve $h^2$, connected with the filtering-chamber, whereby the latter may be cleaned, when desired, by opening said valve and closing the lower valve $h'$, the steam passing through the pipe $d$, heating-chamber B, pipe $e$, filtering-chamber F, and blow-off valve $h^2$.

For the purpose of effecting a more perfect purification of the water, alumina or any other coagulating agent having the property of gathering together the fine particles of lime, &c., is introduced into the boiling water just before the same enters the filter. The alumina is contained in a cup or vessel I, which is connected with the discharge end of the supply-pipe $e$ by a pipe $i$, the vessel being also connected with the boiler A by a pipe $j$, so that the alumina will be delivered into said pipe $i$ under a pressure rendered necessary by the pressure in the pipe $e$. As the water passes through the pipe $e$ it is commingled with the alumina which concentrates the particles or foreign matter, in which condition they are more readily intercepted by the filtering medium. The alumina-vessel I is provided with a transparent sight-tube for observing the quantity of alumina discharged from the vessel.

My approved apparatus is very simple in construction, and forms a comparatively inexpensive appliance, as the heat required by the apparatus is taken directly from the boiler, and as the heating-chamber is arranged within the boiler the greatest possible amount of heat is obtained in the most economical manner.

The heating-chamber B being comparatively small in diameter and extending lengthwise along the top of the boiler occupies but little room and presents an extensive and shallow heating-chamber in which the water is rapidly heated. As the water in the chamber is heated not only by the surrounding steam in the boiler, but also by the steam introduced into the chamber, the water is thoroughly boiled and freed from lime and other impurities in a very short time.

The filtering apparatus is shown as applied to a locomotive-boiler; but it may obviously be applied to boilers of different construction.

In addition to its use as a filter the apparatus also serves, incidentally, to heat the feed-water before the same is supplied to the boiler.

I claim as my invention—

1. The combination, with a steam-boiler, of a water-heating chamber arranged within the boiler and communicating with the interior of the boiler, whereby the water in said chamber is heated by the steam entering the chamber, a spray device whereby the water is delivered into said heating-chamber in a finely-divided condition, and a filter receiving the heated water from said heating-chamber and connected with the interior of the steam-boiler, substantially as set forth.

2. The combination, with a steam-boiler, of a water-heating chamber arranged within the boiler and communicating with the interior of the boiler, whereby the water in said chamber is heated by the steam entering the chamber, a spray device whereby the water is delivered into said heating-chamber in a finely-divided condition, a filter receiving the heated water from said heating-chamber and connected with the interior of the steam-boiler, and a vessel containing alumina or any other coagulating agent and connected with the filter, substantially as set forth.

3. The combination, with a steam-boiler, of a closed heating-chamber B, arranged lengthwise within the boiler and extending along the upper portion thereof, a steam-supply pipe $d$, connected with said heating-chamber and terminating in the dome of the boiler, a spray-pipe arranged in said heating-chamber, a water-supply pipe connected with said spray-pipe, a filter, a pipe connecting the filter with the heating-chamber B, and a pipe whereby the purified water is conducted from the filter into the boiler, substantially as set forth.

4. The combination, with a steam-boiler, of a closed heating-chamber B, arranged within the boiler and connected with the interior of the boiler by a pipe $d$, terminating in the dome of the boiler, a spray-pipe $c$, arranged within said heating-chamber, a water-supply pipe $b$, connected with said spray-pipe, a filter E, a pipe $e$, connecting the filter with the heating-chamber B, a pipe $g$, whereby the purified water is conducted from the filter into the boiler, a vessel I, containing alumina or any other coagulating agent, and connected with the filter supply-pipe $e$, and a steam-pipe $j$, connecting the vessel I with the interior of the steam-boiler, substantially as set forth.

Witness my hand this 11th day of December, 1888.

VIRGIL H. McCONNELL.

Witnesses:
C. F. GEYER,
C. D. HOWE.